Figure 1:
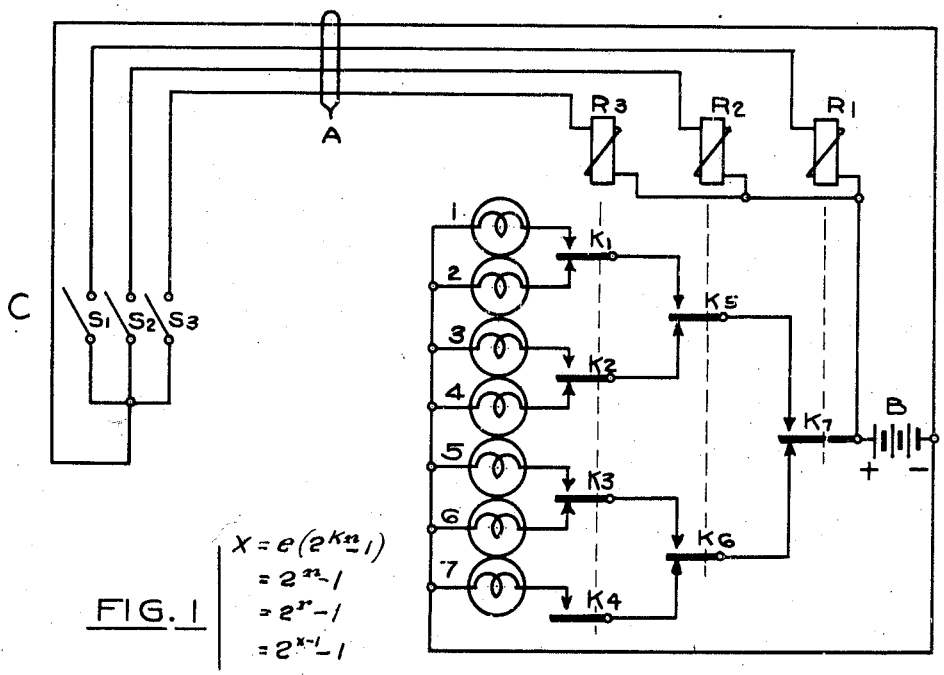

July 22, 1947.   P. D. LOWELL   2,424,243
REMOTE CONTROL SYSTEM
Filed Jan. 19, 1944   12 Sheets-Sheet 1

$$X = e(2^{Kn} - 1)$$
$$= 2^n - 1$$
$$= 2^x - 1$$
$$= 2^{x-1} - 1$$

$$X = e(2^{Kn} - 1)$$
$$= 2^n - 1$$

INVENTOR.
PERCIVAL D. LOWELL
BY John B. Brady
ATTORNEY

INVENTOR.
PERCIVAL D. LOWELL
BY John O. Brady
ATTORNEY

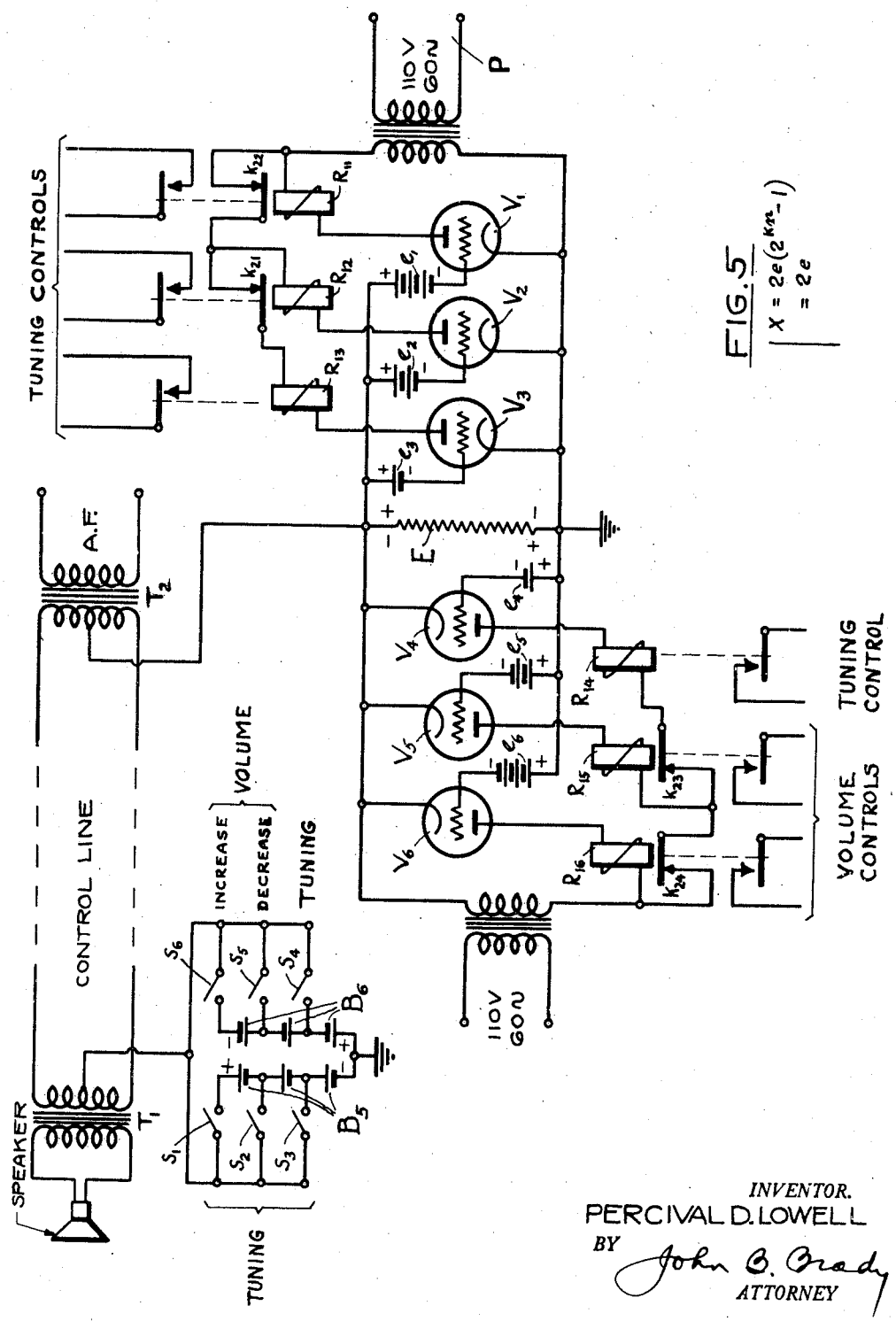

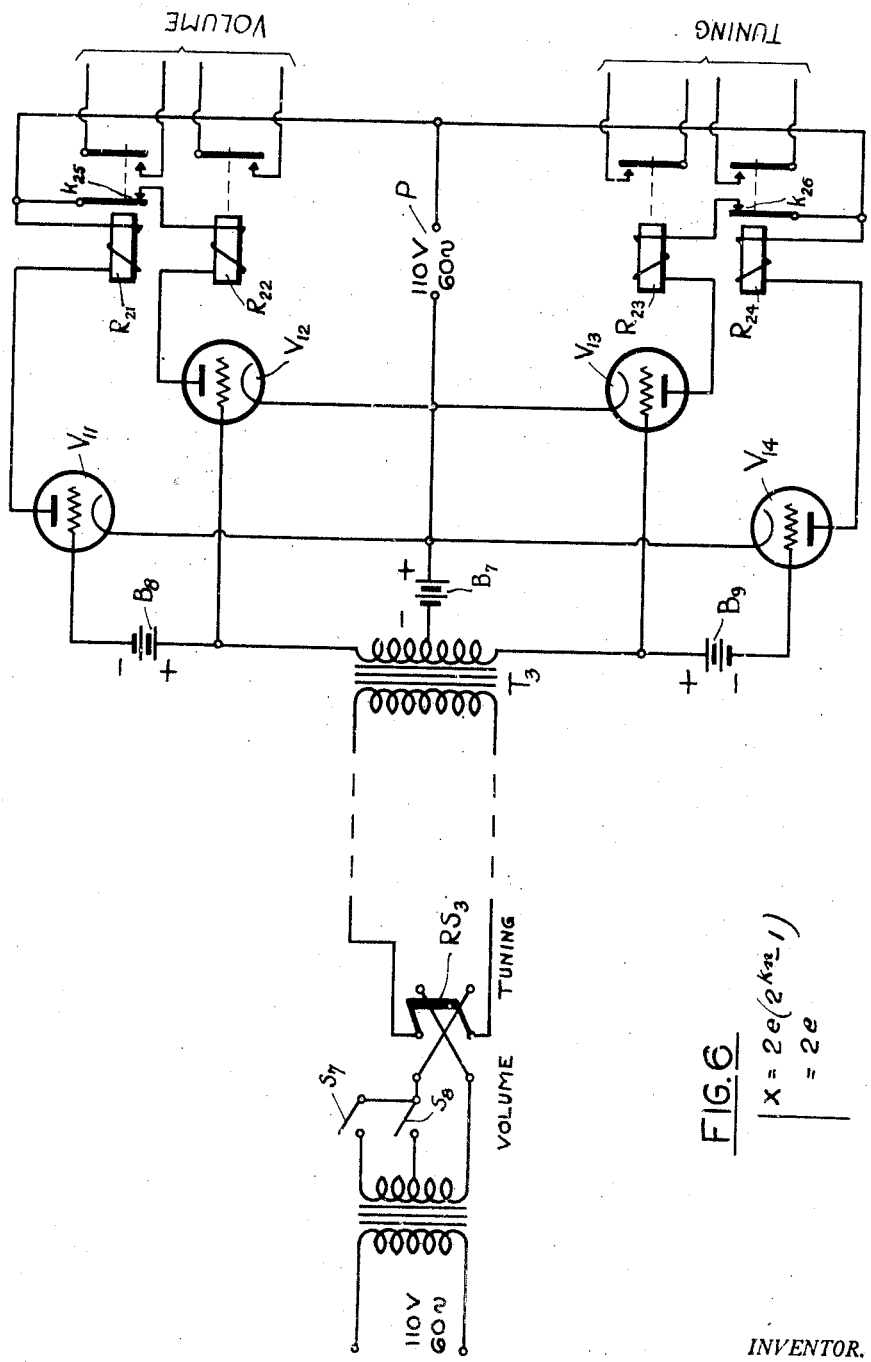

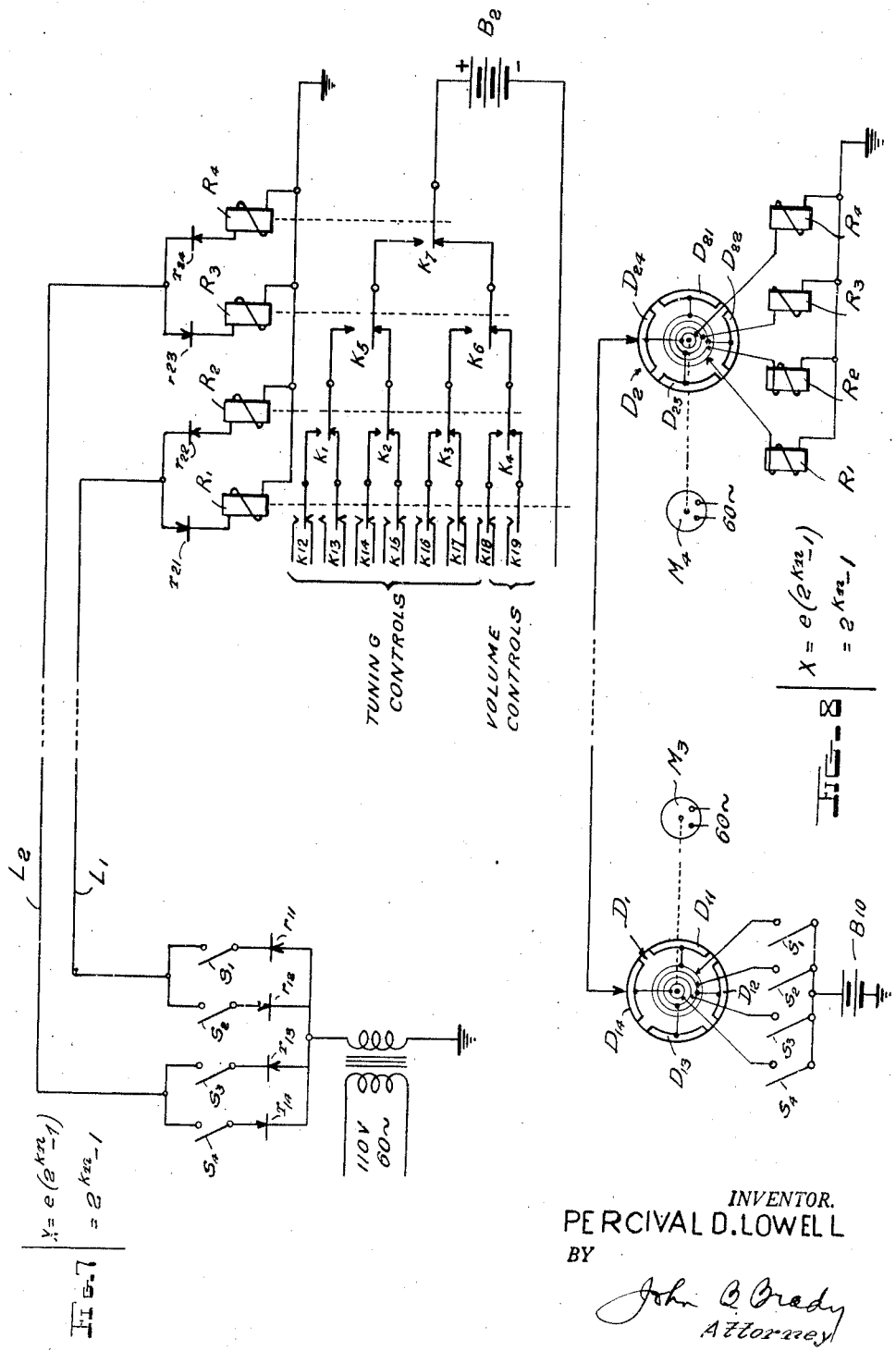

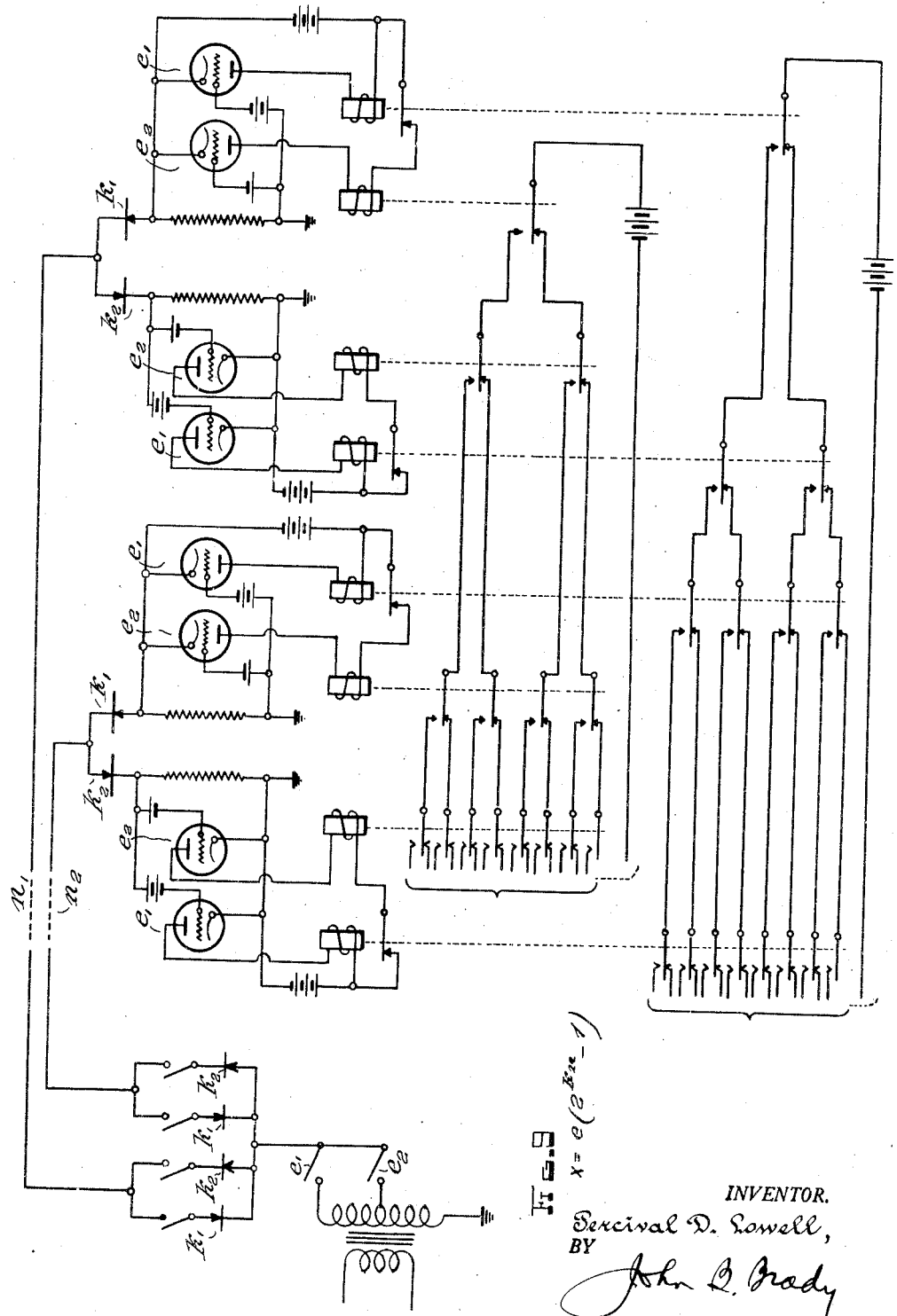

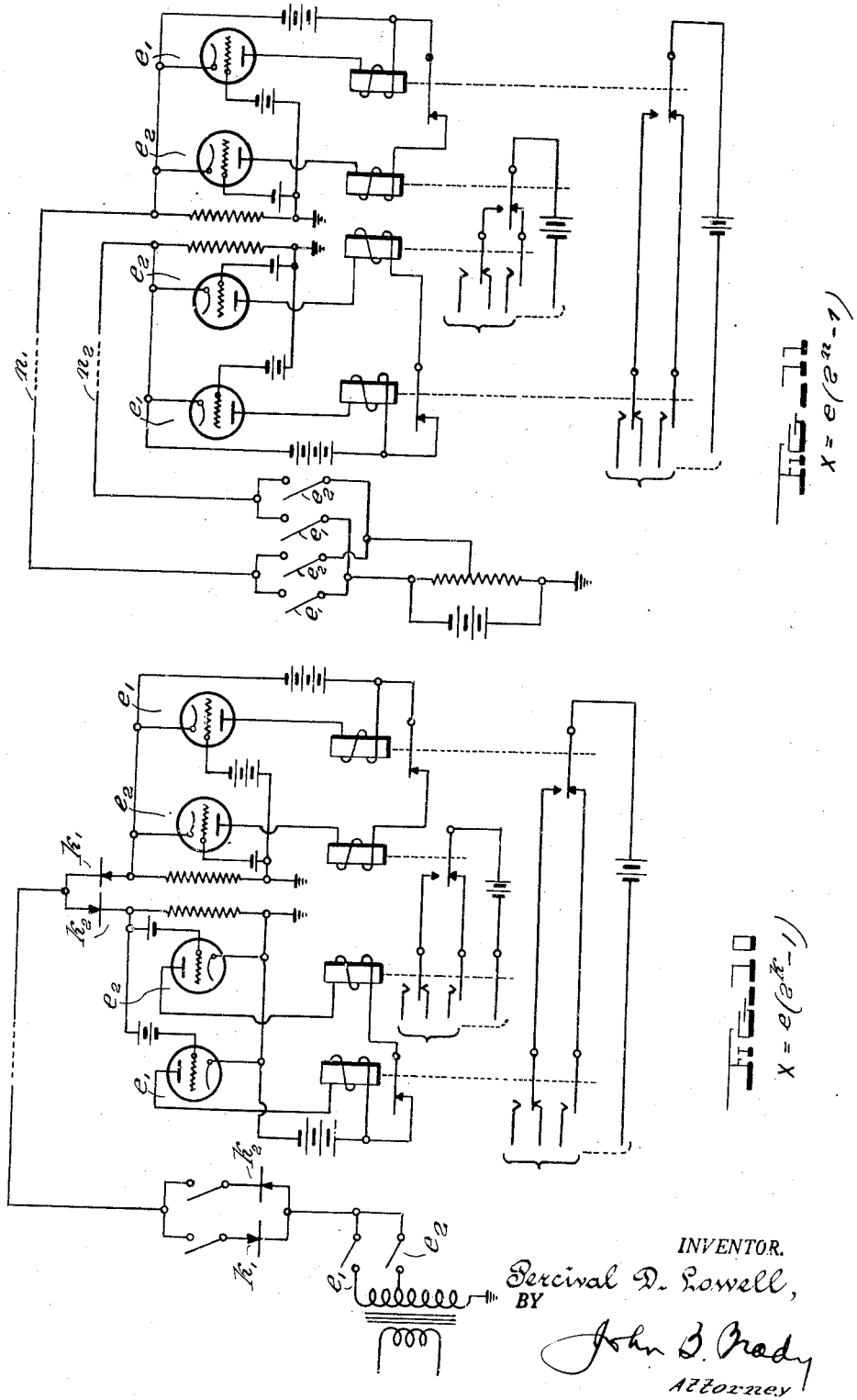

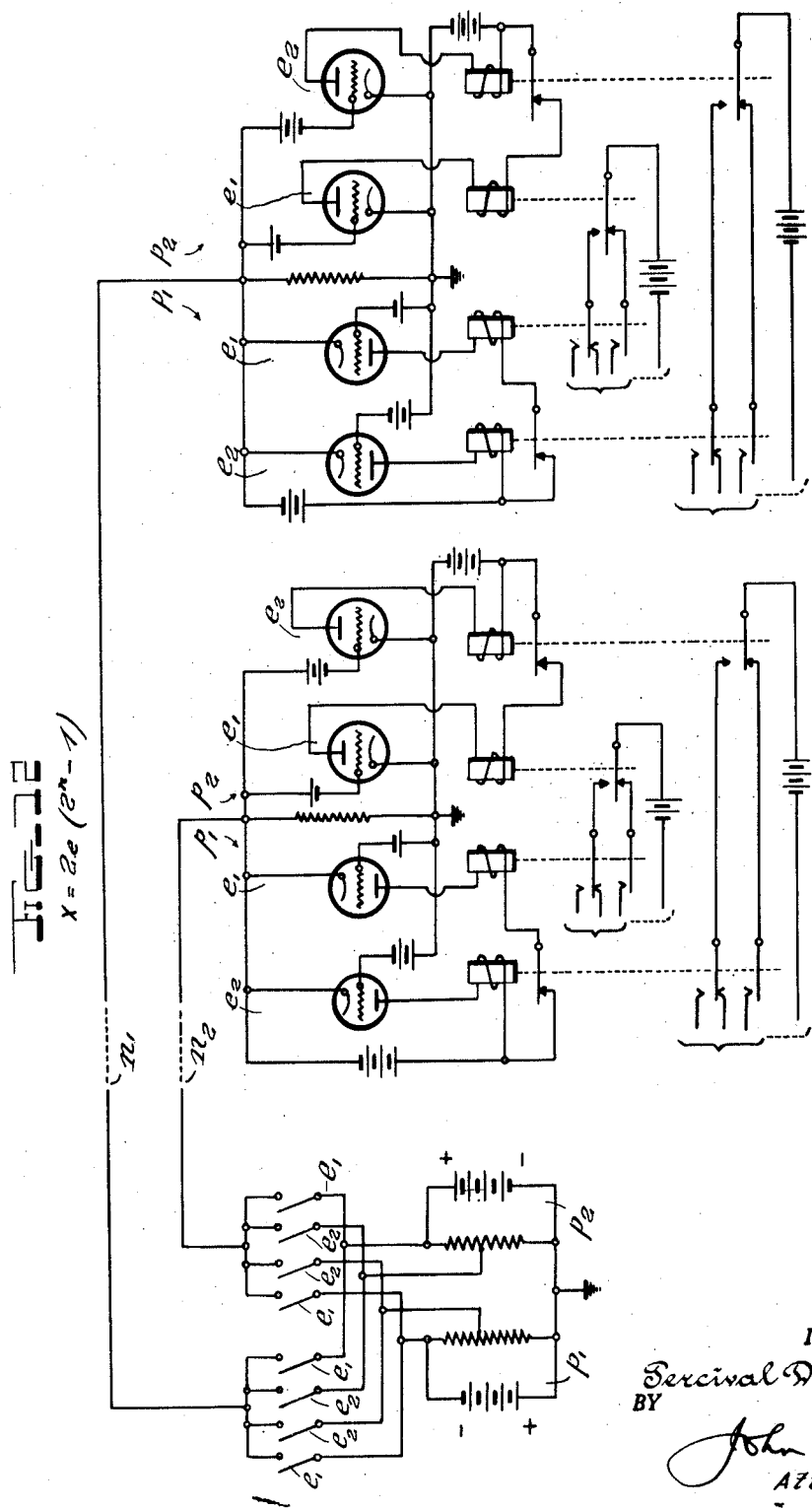

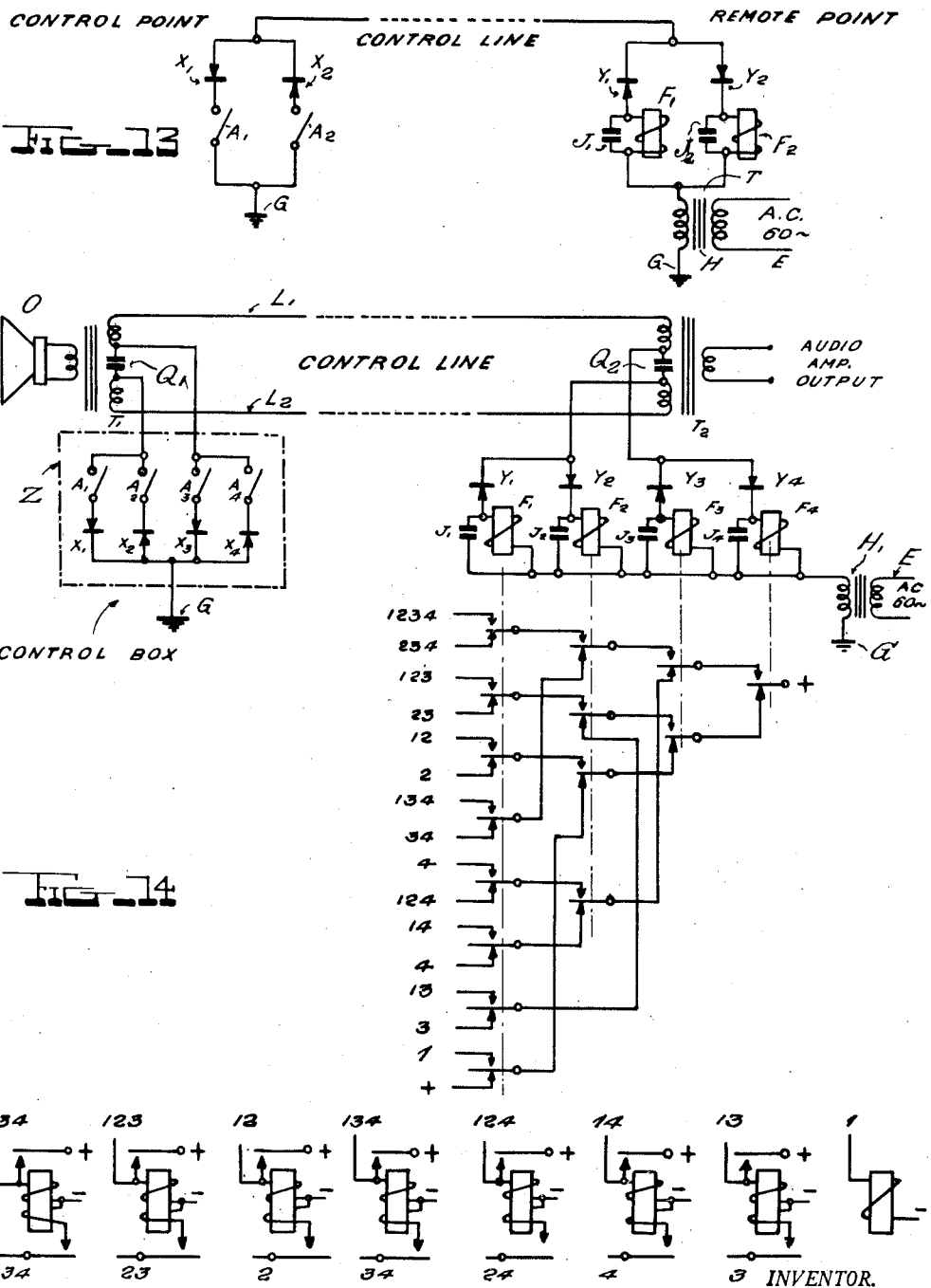

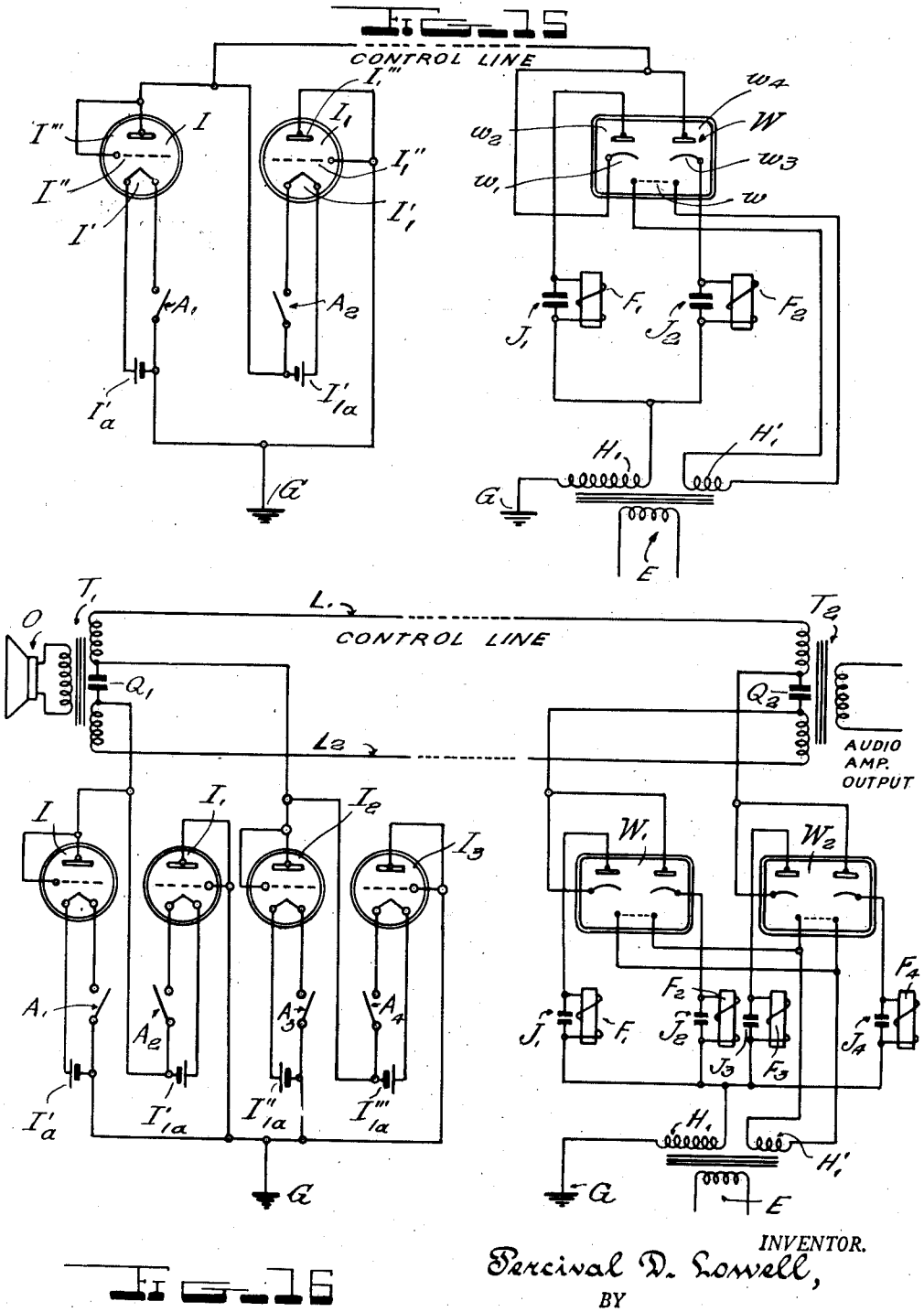

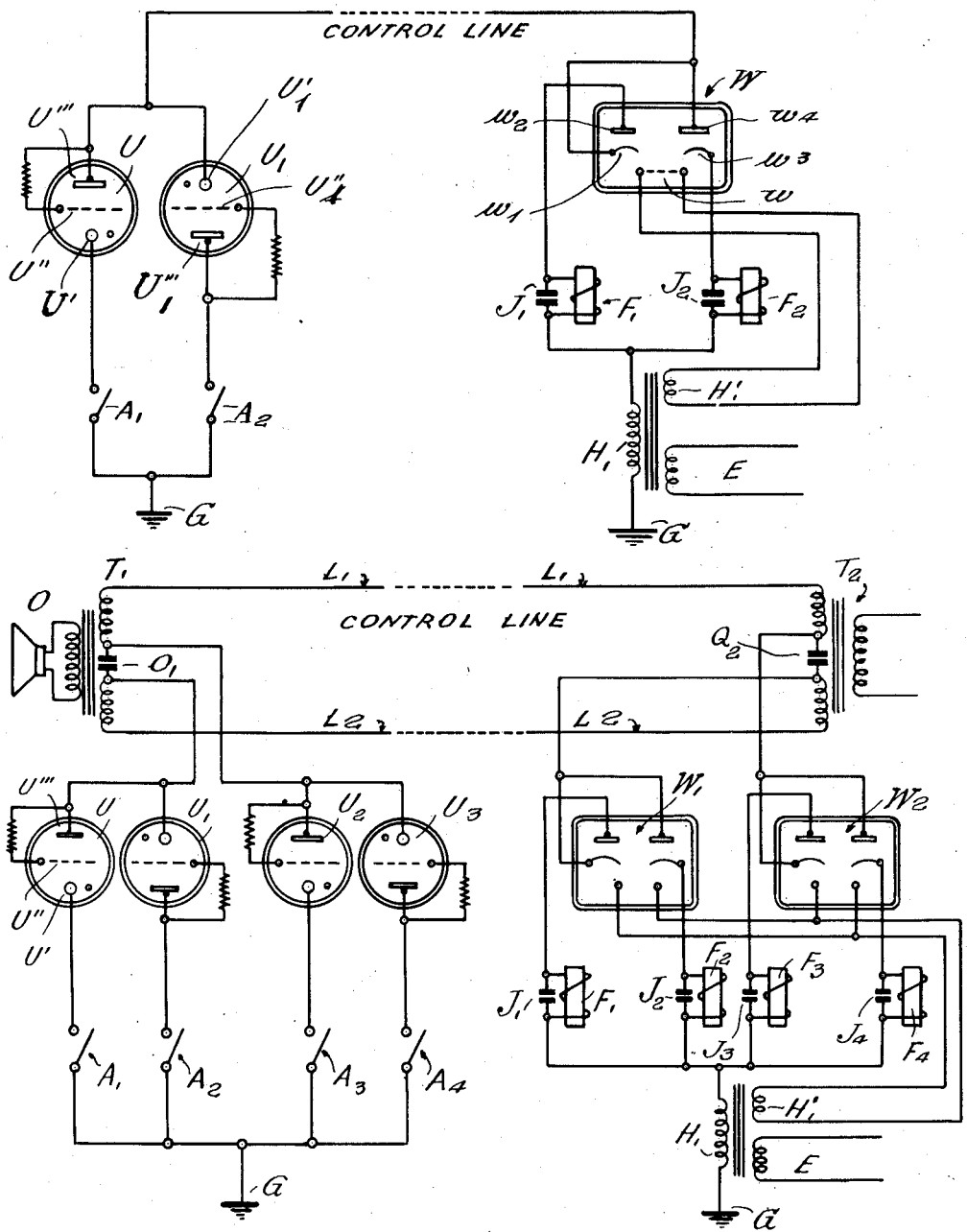

Patented July 22, 1947

2,424,243

UNITED STATES PATENT OFFICE 2,424,243

REMOTE CONTROL SYSTEM

Percival D. Lowell, Chevy Chase, Md.

Application January 19, 1944, Serial No. 518,896

3 Claims. (Cl. 177—353)

My invention relates broadly to remote control systems and more particularly to a remote control arrangement adapted for selective and regulatory functions in cooperation with a radio receiving system.

This application is a continuation-in-part of my application Serial Number 350,997, filed August 3, 1940, for Remote control systems.

One of the objects of my invention is to provide a simplified arrangement for multiple remote control functions, employing a limited number of control circuits.

Another object of my invention is to provide a remote control system having a plurality of actual control circuits interrelated and cooperable to effect $2^n-1$ control functions, where $n$ is the number of actual control circuits.

A further object of my invention is to provide means responsive to selected control factors for effecting a plurality of control functions, such means being dependent upon the character of the control source, the remote control line and the control functions to be performed.

Still another object of my invention is to provide a remote control system operative under conditions of alternate polarity, with the same or different control functions associated with the conditions of alternate polarity, and with provision for a plurality of control functions under each polarity.

A still further object of my invention is to provide a remote control system for radio receiving circuits with means for tuning the circuits to selected frequencies, and power and volume control means.

Another object of my invention is to provide a remote control system employing a plurality of control relays actuated singly or in groups for selectively producing a desired control function in accordance with a predetermined arrangement.

Still another object of my invention is to provide a remote control system employing direct current in conjunction with rectifier means, and control relays selectively operative in accordance with the direction of the direct current in respect to the rectifier means.

A further object of my invention is to provide a remote control system employing electron tubes biased to cut-off at different potentials and control relays connected therewith and selectively actuated in accordance with the magnitude and polarity of a control potential with respect to the different cut-off potentials.

A still further object of my invention is to provide a system for the remote control of multiple circuits over a single pair of wires where the power source for effecting the control is located entirely at the controlled station and no power of any kind is required at the control end of the system.

Another object of my invention is to provide an arrangement of electron discharge paths controllable at a remote control station for selectively controlling the operation of relays at a distant station.

A still further object of my invention is to provide a novel arrangement of cold cathode tubes in a remote control system for electronically controlling the operation of a multiplicity of relays.

Figure 3:
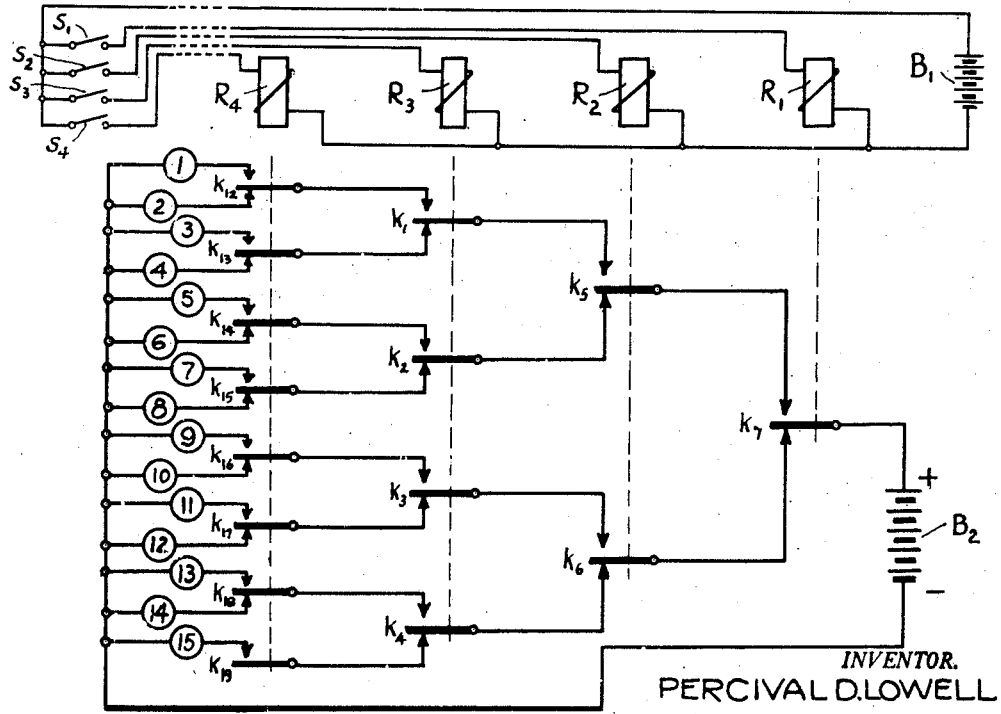
Figure 2:
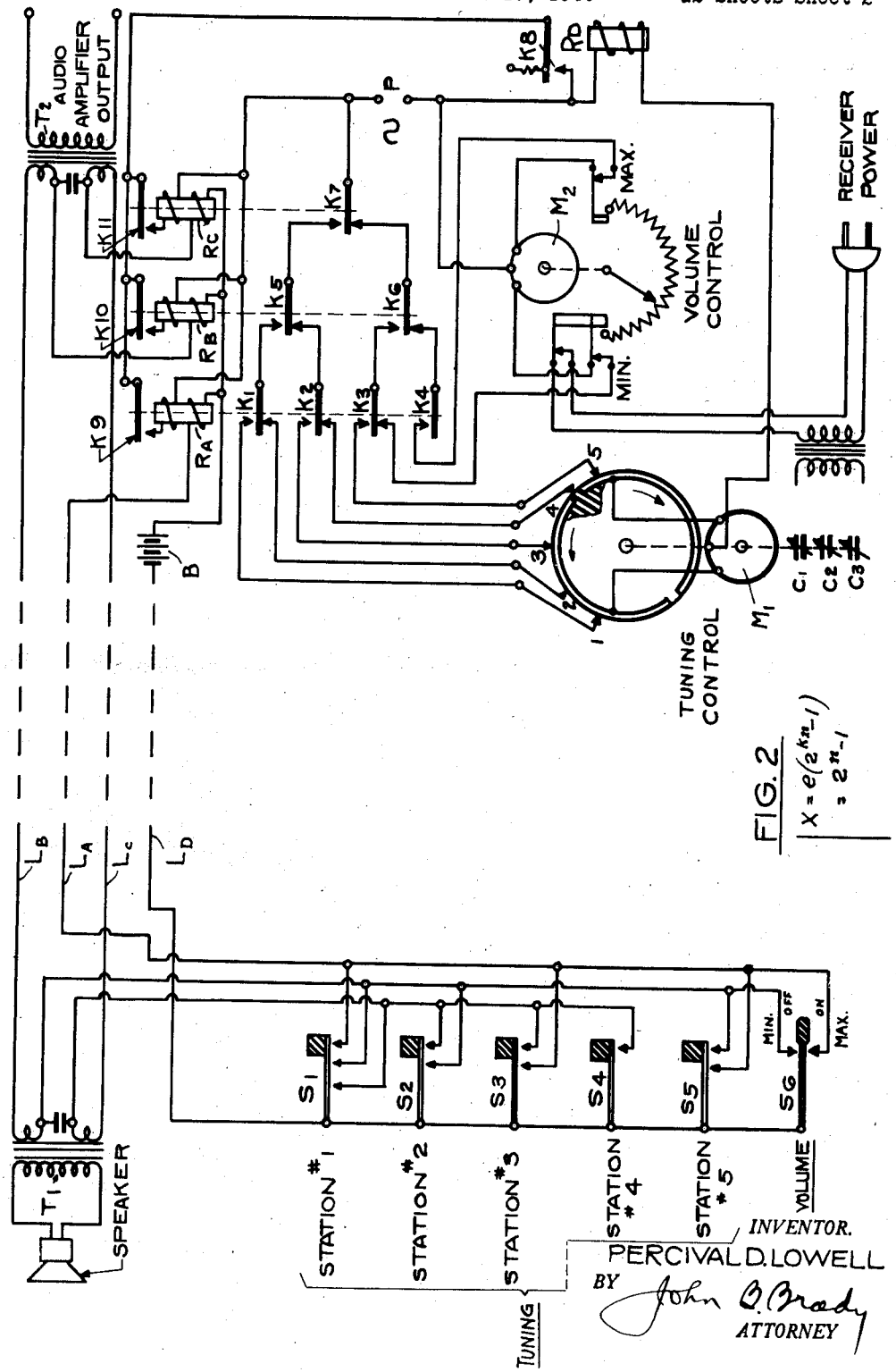
Figure 4:
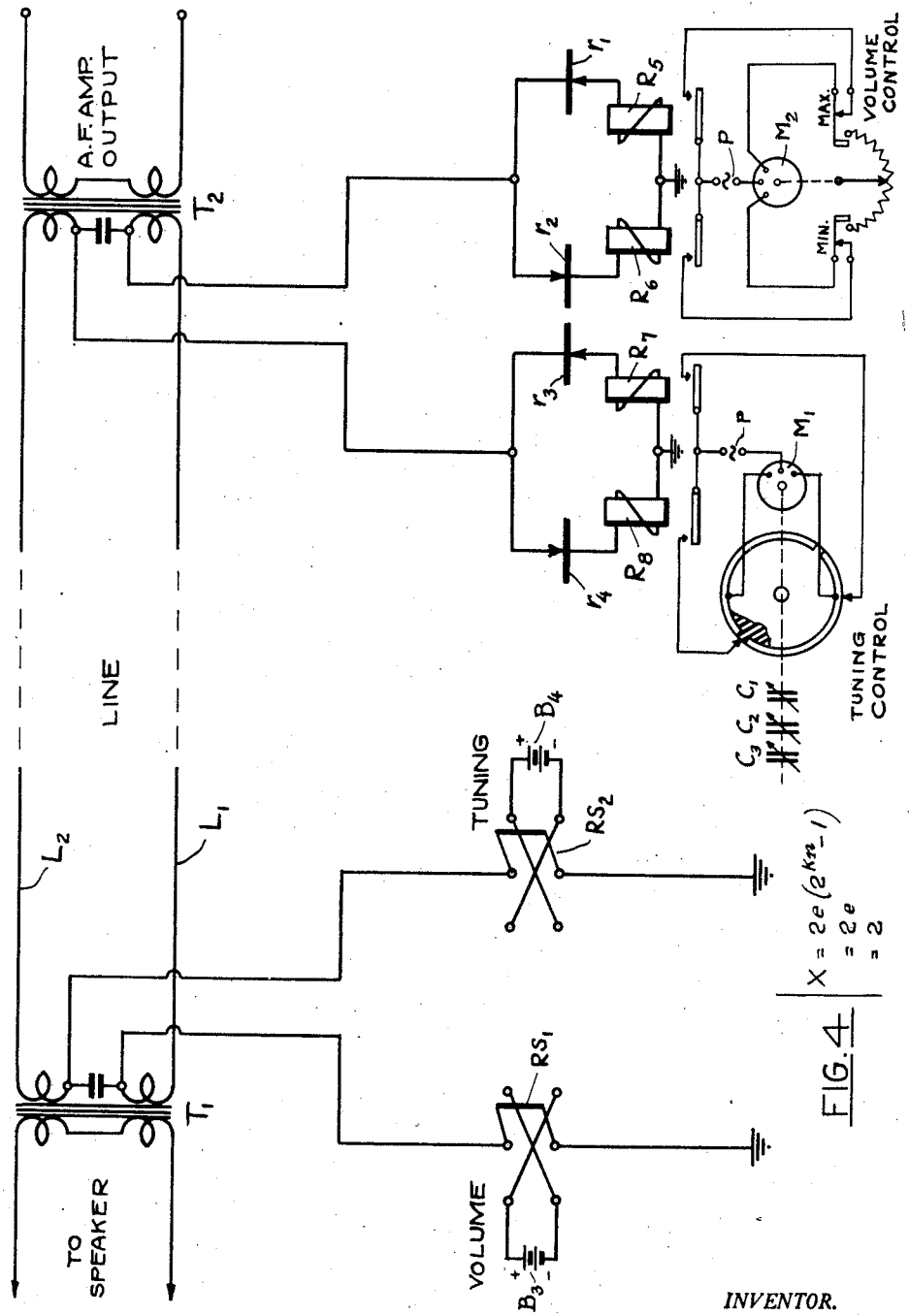

Other and further objects of my invention reside in the systems and circuit arrangements hereinafter described in more detail, with reference to the accompanying drawings, in which:

Figure 1 is a schematic diagram of one form of remote control circuit embodying the principles of my invention in general form; Fig. 2 is a schematic diagram of a substantially complete embodiment of my invention for remote control of tuning and regulating functions in a radio receiving circuit; Fig. 3 is a schematic diagram indicating an extension of the system of Fig. 1; Fig. 4 is a schematic diagram of a modified form of remote control system for the tuning and regulatory controls of a radio receiving circuit; Fig. 5 is a schematic diagram of a further modified form of remote control system for the tuning and regulatory controls of a radio receiving circuit; Fig. 6 is a schematic diagram of a remote control system similar to that of Fig. 5 but employing alternating control potentials in lieu of the direct control potentials employed in the system of Fig. 5; Fig. 7 is a schematic diagram of a remote control system similar to that of Fig. 3 but employing the separate phases of an alternating potential as control potentials; Fig. 8 is a schematic diagram indicating a modification in the system of Fig. 7; Fig. 9 illustrates an arrangement representing the application of plural voltage values as shown in Fig. 6 to the system of Fig. 7; Fig. 10 is a diagram of an arrangement similar to that of Fig. 9 but limited to a single transmission line; Fig. 11 shows an arrangement embodying the features of Figs. 1 and 5, with plural transmission lines and plural voltage values; Fig. 12 is a schematic diagram of a further arrangement, similar to that of Fig. 11 but employing also control potentials of opposite polarities, as in Fig. 6; Fig. 13 is a schematic view showing the principles involved in a modified form of control circuit embodying my invention; Fig. 14 is a schematic view illustrating one of the embodiments of the remote control system of my invention utilizing the principles illustrated in Fig. 13; Fig. 15 shows a modified form of the circuit of my invention in which low power direct heater filament tubes are arranged in the control circuit at the remote control station; Fig. 16 shows a multiple circuit control system using the principles set forth in Fig. 15; Fig. 17 shows another modified form of my invention employing cold cathode tubes at the remote control station; and Fig. 18 shows a multiple circuit employing the principles set forth in Fig. 17.

My invention is directed to means for controlling a relatively large number of functions through the medium of a relatively small number of control channels.

Fig. 1 schematically shows the fundamental control circuit of my invention. I provide means for turning on or off, any one of seven control circuits, designated for the purpose of explaining my invention as electric lamps, from a distant point over a four wire control cable. One of these wires can be replaced by a circuit return through ground if desired, thereby requiring but three wires for the seven controls. The operation of the circuit of Fig. 1 is as follows:

At the control location C, I provide three switches, $S_1$, $S_2$ and $S_3$ connected through the four wire control cable A to three relays, $R_1$, $R_2$ and $R_3$ at the location to be controlled. Relay $R_3$ has three sets of single pole double throw contacts, $K_1$, $K_2$, $K_3$ and one "make" contact $K_4$. Relay $R_2$ has two sets of single pole double throw contacts, $K_5$ and $K_6$. Relay $R_1$ has one set of single pole double throw contacts, $K_7$. Elements numbered 1, 2, 3, 4, 5, 6 and 7 are the circuits to be controlled which by way of illustration of my invention herein are shown as electric lamps. A battery is indicated at B. If switch $S_1$ is closed, battery current will flow through winding of relay $R_1$ and the armature will cause the moving contact of $K_7$ to pull up. A circuit is now closed from positive battery through the upper contact of $K_7$, thence through the lower contacts of $K_5$ and $K_2$, thence through the filament of lamp 4 and back to negative battery and lamp 4 lights. If switch $S_2$ is closed, relay $R_2$ operates, pulling the movable arms of $K_5$ and $K_6$ to the upper contacts and the battery current will then flow through lower contact of $K_7$, thence through the upper contact of $K_6$, thence through the lower contact of $K_3$ and through lamp 6 and back to battery, lighting lamp 6. By tracing the circuits in a similar manner, it will be found that closing switch $S_3$ will light lamp 7; closing switches $S_1$ and $S_2$ simultaneously will light lamp 2; closing switches $S_1$ and $S_3$ together will light lamp 3; closing $S_2$ and $S_3$ will light lamp 5; and closing $S_1$, $S_2$ and $S_3$ all together will light lamp 1. Thus in this instance, seven operations can be controlled over a four wire cable or telephone line or on a three wire line with a ground return for the common side of the circuit.

While Fig. 1 indicates metallic channels, other types of channels can readily be used much as for instance a radio frequency carrier having three different audio modulation frequencies with selective audio filters at the controlled terminal or a one wire line with ground return carrying three audio frequencies might be used. It will be found that if four control switches and four relays are employed, then a total of fifteen controlled functions can be obtained over five control channels. If five control switches and five relays are used, then a total of thirty-one controlled functions can be obtained over six control channels. The equation for determining the number of possible controls over a given number of channels is:

$$X = 2^{x-1} - 1$$

where:
$X$ = the number of ultimate controls,
and
$x$ = the number of control channels, including the common return channel or ground return.

This can also be expressed in terms of relays such as $R_1$, $R_2$ and $R_3$:

$$X = 2^r - 1$$

where $r$ = the number of control relays.

In cases where the number of ultimate controls is known and it is desired to ascertain the number of control relays required the expression below can be used:

$$r = \frac{\log (X+1)}{.301}$$

While Fig. 1 shows a method of controlling electric lamps, the system of my invention has many applications, one of which is illustrated in Fig. 2. Fig. 2 shows a complete circuit for controlling a remote radio broadcast receiver, including means for tuning the circuits automatically to any one of five preselected stations by pushing buttons, controlling the volume and returning the audio signals back over two wires of the control line to the loud speaker at the control point. The station selector buttons at the control end need only to be pressed for an instant and the remote tuning motor is set into operation and continues until the desired station is tuned in and then stops. The volume control is operated by holding a single pole double throw switch either in one position or the other of two limiting positions and the motor-driving volume control at the remote end will travel clockwise or counterclockwise until the control switch is returned to the center or off position causing the volume control motor to stop.

Considering the circuit of Fig. 2 in more detail, suppose control switch $S_1$ is pressed. This causes a closed circuit to exist through the windings of transformer $T_1$ and control wires $L_A$, $L_B$, $L_C$ and $L_D$, through winding of transformer $T_2$, through the lower windings of relays $R_A$, $R_B$ and $R_C$ and back to the control point through battery B, thus causing all three relays to operate. This causes all the contacts $K_1$ to $K_7$ to pull up. A second circuit is thereby closed from one side of alternating current source P through upper contact of $K_7$, upper contact of $K_5$ and upper contact of $K_1$ thence to contactor 1 which is in contact with one segment of the two-segment commutator. This commutator is rotated by the reversible A. C. motor $M_1$. The two segments of the commutator are connected to the two contacts on the motor through flexible leads. At the moment, contactor 1 is in contact with the segment which connects to the motor terminal causing the motor to drive the commutator in a counterclockwise direction. Continuing with the circuit, from the motor the circuit goes through winding of relay $R_D$ and back to the other side of the alternating current source P. Relay $R_D$ is operated by the current through the motor and has a contact $K_8$ which closes when the relay operates, causing current to flow from one side of the alternating current source P to contacts $K_9$, $K_{10}$ and $K_{11}$ of the relays. As has been heretofore stated, relays $R_A$, $R_B$ and $R_C$ have closed and alternating current flows through the commutator and motor causing the commutator to start rotating counterclockwise and relay $R_D$ to operate putting alternating current through the three relay windings through their contacts $K_9$, $K_{10}$ and $K_{11}$. This latter operation causes the relays to lock in and the control switch may be opened. The commutator continues to rotate until the break between the two segments comes to contactor 1 when the alternating current to the motor is broken. This causes the motor to stop, relay $R_D$ to fall out, opening contacts $K_8$ and breaking the alternating current power to relays $R_A$, $R_B$ and $R_C$ causing them to open and everything is thereby returned to a normal condition.

Attached to the shaft of motor $M_1$ is the multiunit condenser $C_1$, $C_2$ and $C_3$ for tuning the radio receiver. Thus the tuning control of the receiver has been rotated to a certain predetermined position favorable for receiving a broadcast station. The audio signals are returned to the speaker at the control and through transformer $T_2$, control wires $L_B$ and $L_C$, and transformer $T_1$.

Likewise if control switch $S_5$ is closed, contactor 5 will connect alternating current power to the motor terminal which causes a clockwise rotation until the break between the two segments reaches contactor 5 when the motor stops and another broadcast station is tuned in. In a similar manner, closing switches $S_2$, $S_3$ and $S_4$ will cause the motor to rotate in a direction which will be the shortest path between the break in the commutator segments and the contactors 2, 3, or 4.

Switch $S_6$ is used to operate the distant volume control. If $S_6$ is closed to the upper contact, relay $R_B$ is operated alone and an alternating current power circuit is completed through the lower contacts of $K_7$, upper contacts of $K_6$ and lower contacts of $K_3$, thence to the lead of motor $M_2$, which causes a clockwise rotation of the volume control. This rotation will cease the moment switch $S_6$ is returned to the midway position. If the switch $S_6$ is held down, the motor will continue to rotate until the arm of the volume control strikes a switch, which will open the line to the motor; also, two other contacts on this switch will break power to the receiver. This latter operation is to be used as the on-off control for the receiver power. Now, if switch $S_6$ is pushed in the down position, relay $R_A$ will be energized alone causing alternating current to flow through lower contacts of $K_7$, lower contacts of $K_6$, and upper contacts of $K_4$, putting power into the lead to motor $M_2$, which will cause a counterclockwise rotation. The contact arm on the volume control will then be rotated in a counterclockwise direction, releasing and closing the receiver power circuit and then rotating toward the maximum volume end until stopped by releasing switch $S_6$, or by hitting the end switch which will stop the motor. Thus, by pressing switch $S_6$ either up or down, the remote volume control can be continuously varied in either way, and when the desired volume is obtained, the switch $S_6$ is released.

Fig. 3 shows the relay contact arrangement to be used when four control relays are employed. If any of the relays $R_1$, $R_2$, $R_3$ and $R_4$, are energized either singly or in combination, any one of fifteen devices may be put into operation.

In Fig. 3, elements $S_{1-3}$, $R_{1-3}$ and $K_{1-7}$ are identical to those of Fig. 1. Separate battery sources $B_1$ and $B_2$ however, replace the common source B of Fig. 1. Relay $R_4$, with control contacts $K_{12-19}$ and controlled by switch $S_4$, provides the additional circuits to increase the controlled devices from seven to fifteen as indicated. The operation will be clear from Fig. 3 and the foregoing description of Figs. 1 and 2. The additional controlled devices may be different tuning means affording a wider range of station selection, or may be employed to effect other control functions such as change of frequency band, fidelity or sensitivity control.

In Figs. 1–3, I have illustrated the direct application of relay control voltages of like polarity from a common source of control energy. By employing control voltages of opposite polarities in conjunction with rectifier means, double the number of control functions may be effected through a given line system. A simplified arrangement for utilizing two lines is shown in Fig. 4, however, for the control of only four functions, two in a tuning control of the type shown in Fig. 2, and two in a volume control of similar form.

At the left of Fig. 4 is shown a battery $B_3$ and a reversing switch $RS_1$, by means of which a current may be sent over the line $L_1$ in such a manner that when the switch is in one position, the line will be positive with respect to ground, and when the switch is in the reversed position, the line will be negative with respect to ground. The ground is shown as the return path for the current.

At the receiver end of the line I provide two rectifiers $r_1$ and $r_2$, and also, two relays $R_5$ and $R_6$, connected between the line and ground as shown. The relays have "make" contacts which are connected to the alternating current power source at P and to the reversible alternating current motor $M_2$ in such a manner that if the contact of relay $R_5$ closes, the motor will run clockwise, and if the contact of relay $R_6$ closes, the motor will run counterclockwise. The volume control of the radio receiver is driven by motor $M_2$. Limit switches are arranged so that the arm of the volume control will break the motor current when the arm reaches either end of its permissible rotation. The operation of the circuit thus described is as follows:

If switch $RS_1$ is thrown, for example, to the left, the battery $B_3$ is connected to the line and ground with the positive on the line. At the receiver end of the line, rectifier $r_2$ will pass current and rectifier $r_1$ will not pass current because they are connected in a reverse manner with respect to each other and can only pass current in one direction. Therefore, in the present example, when the line is positive, rectifier $r_2$ will pass current and will cause relay $R_6$ to operate, closing its contacts and causing motor $M_2$ to rotate in a clockwise direction and the volume control arm to travel towards the minimum volume end position. Rotation will continue until switch $RS_1$, or the limit switch is opened. Now, if switch $RS_1$ is thrown to the right, the negative battery is connected to the line and positive to ground and current will now flow through rectifier $r_1$ and relay $R_5$, but not through rectifier $r_2$ and relay $R_6$. The contacts of relay $R_5$ then close, causing motor $M_2$ to rotate in a counterclockwise direction, driving the arm of the volume control towards the maximum volume end until switch $RS_1$ or the particular limit switch is opened. An additional "break" contact may be added to the minimum volume end of the volume control so that if the switch RS₁ is held closed in the left position long enough to cause the volume control arm to reach the extreme clockwise position, the volume control arm will operate to open the alternating current power to the filament and plate supply to the receiver.

Fig. 4 also shows an identical circuit employed to control the tuning of a remote receiver, over a second line $L_2$. The lines $L_1$ and $L_2$, used in conjunction with the two circuits shown in Fig. 4 to control volume and tuning remotely, are also used to return the radio signals back to the loud speaker at the control end.

By following the circuit, it will be seen that control switch RS₂ will cause rectifier $r_3$ or $r_4$ to conduct current, and relay $R_7$ or $R_8$ to operate, depending upon the polarity of the battery $B_4$ connected to the line $L_2$. Relays $R_7$ and $R_8$ will cause the tuning motor $M_1$ to drive the tuning condensers $C_1$, $C_2$ and $C_3$, either clockwise or counterclockwise, and relays $R_5$ and $R_6$ will cause the volume control motor to drive the volume control either clockwise or counterclockwise. The transformers $T_2$ and $T_1$ will allow the radio signals to be conducted from the audio amplifier output of the receiver over the lines $L_1$ and $L_2$ to the loud speaker located at the control end, similarly as in Fig. 2. Blocking condensers serve to isolate the two control wires from each other insofar as the control battery potentials are concerned, but allow a low impedance path for the audio frequency signals, as will be understood.

Thus, in the system of Fig. 4, four control functions are provided over a two wire remote control line. The tuning control circuit may be duplicated to provide two additional selective circuits through the commutator which controls motor $M_1$ over one additional line; or the relays $R_5$ and $R_7$, $R_6$ and $R_8$, for example, may be grouped and provided with additional contacts arranged in the manner of contacts $K_3$, $K_4$ and $K_6$ of relays $R_A$ and $R_B$ in Fig. 2, providing one additional control through each group when both relays are operated without the provision of another line.

A further modified form of remote control embodying the direct application of control voltages in the manner of Figs. 1-3, and the application of control voltages in opposite polarities in the manner of Fig. 4, is shown in Fig. 5, with a variation thereof in Fig. 6. Three element electric discharge tubes are employed as selective control means responsive to the magnitude and polarity of a control voltage, wherefore only a single control link is required between the control and the receiving positions.

The circuit of Figs. 5 and 6 makes use of the fact that when the grid of a three element electron tube is biased negatively by an amount sufficient to cut off the plate current, then a positive potential applied to the grid from another source, equal to or greater than the bias voltage, will cause the plate current to flow.

If two electron tubes are connected with their grids in parallel but having a negative bias greater on one grid than on the other, then an applied positive voltage equal to the negative bias on the less negative grid will cause one tube to draw plate current, and an applied positive voltage equal to the negative bias on the greater negative grid will cause both tubes to draw plate current. Each tube has a relay connected in its plate circuit. The relay in the plate circuit of the tube having the high bias may have its contacts arranged to break the plate circuit to the other tube so that when both tubes are conductive, only one relay will ultimately be closed. Additional contacts on each relay may be used to control any operation desired such as starting a motor, tuning a radio receiver to different frequencies, and many other operations.

Fig. 5 shows one application of the circuit of my invention in which any one of four predetermined frequencies of a radio broadcast receiver can be selected and the output level increased and decreased from a remote point, with the audio signals being returned over the control line to a loud speaker at the control point. Only one pair of wires are required, and while Fig. 5 shows only six remote operations, more can be effected by adding more electron tubes having different amounts of grid bias.

At the left of Fig. 5 I have shown a series of switches $S_1$, $S_2$, $S_3$, $S_4$, $S_5$ and $S_6$ connected with two sets of batteries $B_5$ and $B_6$ so that by closing any one of the switches, various values of voltage of both positive and negative polarity can be impressed between the control line and ground through transformers $T_1$ and $T_2$ and over the control line to the receiver location and across resistor E. To the right of resistor E are shown three electron tubes of the three element grid-controlled rectifier type, each having the grid thereof biased negatively to cut-off and beyond. For instance, tube $V_3$ is biased at $e_3$ just to cut-off, tube $V_2$ is biased at $e_2$ five volts more negative than cut-off, and tube $V_1$ is biased at $e_1$ ten volts more than cut-off. When switch $S_3$ is closed, for example, five volts is impressed across resistor E, the grounded terminal being negative. Thus, the negative grid bias $e_3$ of tube $V_3$ is overcome and tube $V_3$ draws plate current from the alternating current source P and the relay $R_{13}$ in its plate circuit operates. Now, if switch $S_3$ is released and switch $S_2$ is closed, a control voltage of ten volts is impressed across resistor E, in the same polarity as before. Both tubes $V_2$ and $V_3$ have their grid bias overcome and both tubes draw plate current and both relays $R_{12}$ and $R_{13}$ close. However, as soon as relay $R_{12}$ operates, contacts $K_{21}$ open the plate circuit to tube $V_3$ and relay $R_{13}$ becomes inoperative.

If switch $S_1$ is closed, a power of fifteen volts is impressed across resistor E, in the same polarity as before, and all three tubes $V_1$, $V_2$ and $V_3$ operate, closing all three relays $R_{11}$, $R_{12}$ and $R_{13}$ but contacts $K_{22}$ on relay $R_{11}$ open the plate circuits to tubes $V_2$ and $V_3$, thereby causing relays $R_{12}$ and $R_{13}$ to open, leaving only relay $R_{11}$ closed. During any of the foregoing operations, tubes $V_4$, $V_5$ and $V_6$ cannot be made to operate because their cathodes connect to the terminal of resistor E which is positive and their grids connect to ground which is negative for the above control operations, and the tubes will not operate unless the polarity is reversed. Now if switch $S_4$ is closed, a control voltage of five volts is impressed across resistor E, the grounded terminal being positive. Thus, the grid of tube $V_4$ is made positive to a degree which will cause plate current to flow and close relay $R_{14}$. Similarly, closing switch $S_5$ will operate relay $R_{15}$ and closing switch $S_6$ will operate relay $R_{16}$, contacts $K_{23}$ and $K_{24}$ leaving but one relay operated in either case.

Each one of the relays $R_{11-16}$ carries auxiliary contacts which can be used for tuning and volume control functions similarly as in the system of Fig. 2, or in any other manner. The audio frequency signals from the audio frequency amplifier are carried through transformer $T_2$, the control line and transformer $T_1$ to the loud speaker at the control end. An arrangement is used which may be either mechanical or electrical, to prevent more than one control switch being closed at the same time in order to avert a short circuit in the battery circuit.

Fig. 6 shows another embodiment of my invention wherein alternating current is used for the control potential and any one of four relays operated. Four grid-controlled rectifier type tubes are shown at $V_{11}$, $V_{12}$, $V_{13}$ and $V_{14}$, whose plate potential is supplied from the 110 volt, 60 cycle source P. Grids of tubes $V_{12}$ and $V_{13}$ are biased negatively to cut-off by battery $B_7$ and tubes $V_{11}$ and $V_{14}$ are biased beyond cut-off by the additional voltages of batteries $B_8$ and $B_9$, respectively. Now, if an alternating current control voltage is impressed across the primary of transformer $T_3$, and the voltage across the upper half of the secondary is held in phase with the alternating current plate voltage from source P, the voltage across the lower half of the secondary will be 90° out of phase with the alternating current source P. If the control voltage be sufficiently high to overcome the grid bias $B_7$, then tube $V_{12}$ will operate to actuate relay $R_{22}$ because the control voltage will be in phase with the plate voltage, that is, while the plate is on the positive half of the cycle the grid will also be on the positive half of the cycle. Tube $V_{11}$ will not operate because the control voltage is not high enough to overcome the added grid bias of battery $B_8$. Tubes $V_{13}$ and $V_{14}$ cannot operate because the control voltage on their grids is out of phase with their plate voltages; that is, while their plates are positive their grids are negative and when their grids are on the positive half of the cycle, their plates are on the negative half of the cycle.

If the control voltage be raised in value sufficiently to overcome the grid bias of tube $V_{11}$, its plate current will flow, closing relay $R_{21}$ which has contacts $K_{25}$ to open the plate circuit to tube $V_{12}$ and cause relay $R_{12}$ to open.

Now, if the alternating current control voltage impressed across primary of transformer $T_3$ be reversed, then the alternating current voltage across the lower half of the secondary will be in phase with the plate voltage source P and tube $V_{13}$ will operate to actuate relay $R_{23}$ because the control voltage on its grid is positive at the same time that its plate voltage is positive. Tubes $V_{11}$ and $V_{12}$ cannot operate because the control voltage on their grids is negative while their plates are positive and while their grids are positive their plates are negative. If the control voltage is raised to such a value that both tubes $V_{13}$ and $V_{14}$ are operated, relay $R_{24}$ will open contacts $K_{26}$ and break the plate circuit to tube $V_{13}$ leaving only relay $R_{24}$ closed.

At the control point, the above mentioned alternating current voltage changes are controlled by reversing switch $RS_3$ through which the phase of the control voltage may be reversed, and by switches $S_7$ and $S_8$ through which different amplitudes of control voltage suitable for overcoming various levels of grid bias of the tubes may be obtained.

Relays $R_{21}$, $R_{22}$, $R_{23}$ and $R_{24}$ can have any contact arrangement desired, to perform a variety of remote operations.

The only requirement for the operation of the circuit shown in Fig. 6 is that the control voltage source must be either in phase or 90° out of phase with the plate supply voltage P. This requirement can usually be met unless the distance from the control point to the remote point is so great that the power is supplied from different generators which might not be of the proper relationship as to phase or speed.

As explained in reference to Fig. 5, the circuit in Fig. 6 may employ more than two tubes on each half of the circuit, each biased successively to a greater amount beyond cut-off, so that additional remote operations can be controlled. The system of Fig. 6 lends itself readily to control of plural functions of different character, in that functions of one sort, such as tuning, may be controlled with switch $RS_3$ in one position, as indicated, and functions of another sort, such as volume control, may be effected with the switch $RS_3$ in reversed or opposite position.

The system of my invention therefore comprehends the control of multiple functions, over a minimum number of control lines. In its simplest forms, Figs. 1–3, only one control relay is associated with any one line. By employing control potentials of selectively opposite polarity and rectifier means connected in opposite relation ahead of a pair of control relays, each line may be employed to serve two relays, one or the other but not both of which may be operated at any given time, as Fig. 4 illustrates. Further extension of the concept of line economy is the adaptation of the principle of progressively increased control potentials for use with selectively operated electric discharge tubes which are employed in turn to operate control relays, only one of which may be operated at any one time, however. Figs. 5 and 6 illustrate the application of this further concept together with reversal of the polarity of the control potentials featured in the system of Fig. 4. It will be understood that multiple line systems similar to those of Figs. 1–3 may be devised with any one of a multiplicity of relays controllable through each line according to the arrangement of Figs. 4, 5 and 6, for the ultimate control of many functions.

A further example of line economy is shown in Fig. 7 where the fifteen control functions represented in Fig. 3 are effected through only two control lines or circuits. The arrangement at the control position is similar to that in the system of Fig. 4 where rectifiers poled in opposite relation are connected in circuit with separate relays and each of the control lines. Thus, line $L_1$ connects through rectifier $r_{21}$ and relay $R_1$ to ground for operation of relay $R_1$ when the line is positive with respect to ground, and through rectifier $r_{22}$ and relay $R_2$ to ground for operation when the line is negative with respect to ground. The connections of line $L_2$ through rectifiers $r_{23}$ and $r_{24}$ and relays $R_3$ and $R_4$, respectively, are similar to those for line $L_1$.

In order that the relays may be separately and simultaneously operated, as are the relays in Fig. 3, provision is made for employing the separate phases of an alternating potential for control purposes, any one relay being operated by current pulsations at the frequency of the alternating potential, delivered through a pair of rectifiers poled in like relation. One of each pair of rectifiers is at the control position, as has already been described; the second is at the remote position in series with the line, an individual control switch, and the source of alternating potential. Thus, line $L_1$ connects through switch $S_1$ and rectifier $r_{11}$ to the transformer source of potential at $P_1$ for controlling the operation of relay $R_1$ in the positive phase of the alternating potential. During the intermediate periods of negative phase in the alternating potential, relay $R_2$ is controllable through switch $S_2$ and rectifier $r_{12}$. Similarly, line $L_3$ connects through switch $S_3$ and rectifier $r_{13}$ for applying positive potentials to the line for operating relay $R_3$, and through switch $S_4$ and rectifier $r_{14}$ for applying negative potentials, from the alternate phases of the alternating potential at $P_1$, to the line for the operation of relay $R_4$.

It will be understood that the frequency of the alternating potential at $P_1$, indicated as 60 cycles per second, is sufficiently high to assure the continued operation of the relays between successive current impulses applied through the rectifiers. Thus, the relays may be simultaneously as well as separately operated, similarly as in the circuit of Fig. 3, for operation of a contact arrangement $K_{1-7}$, $K_{12-19}$, like that in Fig. 3.

In terms of lines, excluding the common return line or ground, the ultimate number of controls possible in a system constructed in accordance with my invention is: $X=2e(2^{kn}-1)$ where $2^n-1$ is the number possible through the system of Figs. 1-3 employing $n$ lines and relays. This becomes $2(2^n-1)$ when reverse polarities are employed, as in Fig. 4 where a second group of relays is provided without increasing the number of lines. The number of possible functions is then multiplied further by the number $e$ of control potentials of different magnitudes employed in all the lines; $e$ is 3 in Fig. 5, and 2 is Fig. 6, while $n$ is 1 in both instances. Fig. 4 comprises essentially two separate systems the above formula applying individually and both $e$ and $n$ being unity, wherefore $X=2$ for each line. The factor $k$ is paramount in the system of Fig. 7 and represents the number of signals applied to each line per cycle of operation; $k$ is unity in the systems of Figs. 1-6 where continuous potentials are employed and has a value of 2 in the system of Fig. 7. The value of $k$ may be increased by employing synchronized distributor means at the remote and control positions with three or more distributor segments, which is the system shown in Fig. 8.

Referring to Fig. 8, a single line $L$ is shown connected to rider contacts on distributors $D_1$ and $D_2$ at the control and remote positions, respectively, driven by synchronous motors $M_3$ and $M_4$. Switches $S_{1-4}$ at the control position and relays $R_{1-4}$ at the remote position are connected respectively to distributor segments $D_{11-14}$ and $D_{21-24}$, so that switch $S_1$ controls relay $R_1$, switch $S_2$, relay $R_2$, etc., and the relays may be separately and simultaneously operated, similarly as in Figs. 3 and 7. A battery source of control potential is shown at $B_{10}$. A relay contact system, not shown but identical to that of Figs. 3 and 7, is employed in conjunction with the control system of Fig. 8. The formula $X=e(2^{kn}-1)$ applies to Fig. 8, wherein $e$ and $n$ are both unity and $k=4$, whence a total of fifteen control functions are effected over the single control circuit.

In order further to illustrate the application of the principles hereinbefore set forth in accordance with my invention, Figs. 9-12 are provided. The circuit of Fig. 9 provides thirty control functions in accordance with the formula $X=e(2^{kn}-1)$ where $e$, $k$ and $n$ have each the value of 2, as indicated generally at $e_1$ and $e_2$, $k_1$ and $k_2$, $n_1$ and $n_2$. Fig. 10 indicates the limitation to six control functions imposed by relinquishment of one of the transmission lines in the system of Fig. 9. Fig. 10, $X=e(2^k-1)$, with $e$ and $k$ each equal to 2, as noted generally at $e_1$ and $e_2$, $k_1$ and $k_2$.

In Fig. 11, the alternative elimination of the factor $k$ instead of $n$ is shown to result in the same number of control functions, six. With $e$ and $n$ each equal to 2, $X=e(2^n-1)$ in Fig. 11, the reference characters $e_1$ and $e_2$, $n_1$ and $n_2$, indicating generally the operation of the system. Fig. 12 illustrates a further embodiment of my invention wherein the number of control functions obtained through the system of Fig. 11 is doubled by use of control potentials of opposite polarity, giving $X=2e(2^n-1)$, where $e$ and $n$ are 2, as in Fig. 11. Reference characters $p_1$ and $p_2$ indicate generally on Fig. 12 the circuits of opposite polarity, while $e_1$ and $e_2$, $n_1$ and $n_2$, indicate the different voltage values and transmission lines as in Fig. 11.

The operation of the various circuits shown in Figs. 9-12 will be clearly understood without further description in view of the detailed explanation of the simpler circuits of Figs. 1-8, as the same principles and general formula are involved.

In Figs. 13 and 14 I have shown remote control circuit arrangements in which the source of power $E$ can be wholly located at the remote end of the line. The source of power $E$ is one that is continually reversing in polarity, either a pole changing device with a battery or what is more convenient a source of 60 cycle alternating current power. Series-aiding and series-opposing rectifiers $Y_1$, $Y_2$, $Y_3$ and $Y_4$ are provided in this circuit.

This is a circuit arrangement designed for controlling a number of electrical operations from a distance, over one pair of wires, $L_1-L_2$ using the ground $G$ as a return circuit. With one pair of wires $L_1-L_2$ fifteen separate functions can be operated and in addition an audio frequency return circuit provided.

Fig. 13 shows the fundamental circuit involved wherein $A_1$ and $A_2$ are selector switches, $F_1$ and $F_2$ are windings of direct current relays shunted by condensers $J_1$ and $J_2$ and $X_1$, $X_2$, $Y_1$ and $Y_2$ are half wave rectifiers and $E$ represents the alternating current power source including a transformer $H$ having its primary connected to the 110 volt 60 cycle mains.

The alternating current circuit from transformer $H$ connects between the junction of the relays $F_1$ and $F_2$ and ground $G$, thereby impressing alternately positive and negative cycles of current between the relay circuits and ground.

The operation is as follows: close switch $A_1$, then the positive half cycles from transformer $H$ will flow through relay winding $F_1$, through rectifier $Y_1$, over the control line $L$ and through rectifier $X_1$, switch $A_1$ and to ground $G$, returning to transformer $H$. Relay $F_1$ will then be operated by the rectified positive half cycles of alternating current. Condenser $J_1$ acts to smooth out the fluctuating direct current.

Alternating current from transformer $H$ cannot flow through the relay $F_2$ because rectifiers $Y_2$ and $X_1$ are connected in series opposition and no current will flow. Therefore relay $F_1$ only will close.

Now, if switch $A_1$ is opened and $A_2$ closed, relay $F_2$ will only operate on the rectified negative half cycles of alternating current from transformer $H$. Current will not flow through $F_1$ because rectifiers $Y_1$ and $X_2$ are series opposing.

If both switches $A_1$ and $A_2$ are closed, current can flow through both relays $F_1$ and $F_2$ because there is a path for both halves of the alternating current cycles through the rectifiers.

Thus I provide three possible different combinations and through the proper arrangement of contactors on relays $F_1$ and $F_2$ can control three separate functions.

When a pair of control wires $L_1$ and $L_2$ are used as in Fig. 14, it is possible to control fifteen functions using the contact system for the four relays as shown. Fig. 14 shows seven secondary relays of the self-locking type any one of which can be locked closed and opened by selecting the proper combination of switches $A_1$, $A_2$, $A_3$ and $A_4$. One additional secondary relay is shown which is of the non-locking type and operated by the fifteenth combination.

The four primary relays $F_1$, $F_2$, $F_3$, $F_4$ with their contact system can be used in a variety of combinations for effecting various circuit arrangements at a remote station.

The outstanding novelty of circuit of Figs. 13 and 14 is the fact that no power of any kind is required at the control end of the system. It is sufficient to provide a source of alternating current at the remote end of the system for its operation. The combination of series-aiding, series opposing rectifiers serve to separate the currents into the various desired paths.

The advantage in not requiring power at the control end of the system is its portability, compactness, simplicity and reliability, there being no tuning or other adjustments required. There are many popular types of control system which require at the control end a source of alternating current power, R. F. oscillators with their necessary tubes, tuned circuits, etc., all of which are objectionable. My circuit of Figs. 13-14 is particularly desirable for field use in the Army where it is often impracticable to provide an alternating current source at the control end of the system.

Fig. 14 also shows how the control wires $L_1$—$L_2$ may be used as an audio frequency channel particularly when the system is to be used to remotely control a radio receiver and it is desired to have the loud speaker O at the control point. A third wire may be used in place of the ground return if desired. This would make the circuit particularly desirable in cases when, for instance, it is desired to listen to and control a radio receiver from a remote position in the field. The speaker and control switches $A_1$—$A_4$ are then combined in one unit, such as control box Z connected to the receiver at the distant location through a small three wire cable such as $L_1$—$L_2$—G. The receiver under these conditions can be located in a remote position but controlled from the position at which control box Z is located and the signals may be checked at the control position on speaker O. The circuit can also be used to control many other devices such as remote control radio transmitters, remote lights, motors, etc.

The audio frequency channel which I provide for communication from the remote station to the control station is made possible by the isolation of the two control lines $L_1$ and $L_2$ by the intermediate condensers $Q_1$ and $Q_2$ at each of the stations as shown. The condensers $Q_1$ and $Q_2$ serve to provide a path for the audio frequency energy controlled from the remote station through transformer $T_2$ which connects to the output of the audio frequency amplifier leading to the voice frequency control channel. The unidirectional currents are confined to the lines $L_1$ and $L_2$ by the blocking effect of condensers $Q_1$ and $Q_2$.

The relay circuits controlled by the four primary relays $F_1$, $F_2$, $F_3$ and $F_4$ are represented at the lower portion of Fig. 14 with the circuits thereof connected to the respective contacts of the primary relays. For simplicity I have omitted the actual interconnections but it will be understood that interconnecting leads are provided between the correspondingly numbered and indicated conductors.

The important feature of the several circuits including the circuits of Figs. 13 and 14 is that separate paths are provided at both the controlling station and the controlled station and in each path there is provided a uni-directional current conducting device. The paths at the control and controlled stations coact with the uni-directional conducting devices therein arranged in series opposing and series aiding relation. The paths at the control station each include selector switches while the paths at the controlled station each include the relay windings. Because of the alternating characteristic of the supply source, a selected relay may thus be activated by operation of the proper selector switch.

Figs. 15 and 16 illustrate an improved form of circuit of my invention in which low power direct heater filament tubes I and $I_1$ are arranged in the separate paths at the controlling station. Tube I includes the cathode I', the control grid I'' and the anode I'''. Tube $I_1$ includes cathode $I_{1'}$, control grid $I_{1''}$ and anode $I_{1'''}$. These may be of the 1G4 triode type with the grid and plate connected together and operating as diode rectifiers. The filaments require only 1.5 volts at .05 ampere for each tube. Therefore, the filament batteries indicated at $I'_a$ and $I'_{1a}$ can be 1.5 volt flashlight size uni-cells. The selector switches $A_1$ and $A_2$ control the on and off condition of the filaments conserving batteries when the control switches are open and starting electron discharge when the switches are selectively closed. These filaments heat up in approximately one second of time so that the control is quite rapid. It will be noted that the filament I' of tube I and the grid plate combination $I_{1''}$—$I_{1'''}$ are interconnected and connected to ground G while the grid plate combination I'' and I''' of tube I is connected with cathode $I_{1'}$ of tube $I_1$ and connected to the line which leads to the controlled station. The controlled station includes the indirect heater type of twin diode represented at W. This may be of the 6H6 type containing a heater $w$ and sets of electrodes including cathode $w_1$ and anode $w_2$ and cathode $w_3$ and anode $w_4$. The incoming line terminates at anode $w_4$ and cathode $w_1$. Two supply paths are provided, one of which leads from anode $w_2$ through relay $F_1$ and condenser $J_1$ to the source of alternating current power designated by transformer $H_1$ connected to ground indicated at G. The other path includes cathode $w_3$ and relay winding $F_2$ shunted by condenser $J_2$ and connected to the alternating current source constituted by transformer $H_1$ as shown. The power transformer $H_1$ has its primary winding connected to a suitable source of 60 cycle alternating current power designated at E. A separate winding $H_{1'}$ on the transformer provides heating current for the heater $w$ of the tube W. The twin diode as represented as being of the 6H6 type requires 6.3 volts at .3 ampere per tube supplied from the local source E.

By selectively starting electronic flow by operation of selector switches $A_1$ and $A_2$ the electronic paths through tube W may be made selectively conductive to operate selectively relays $F_1$ or $F_2$ over the single control line shown.

Where it is desired to control a multiplicity of functions, I arrange the circuits as illustrated in Fig. 16 in which lines $L_1$ and $L_2$ extending between the control station and the controlled station terminate in transformer circuits $T_1$ and $T_2$ which include blocking condensers $Q_1$ and $Q_2$, thus providing two conductive control paths as explained in connection with Fig. 14. In this arrangement a pair of electronic control paths are associated with each of the lines $L_1$ and $L_2$ and the electronic paths selectively controlled by switches $A_1$ and $A_2$, $A_3$ and $A_4$. Each electronic discharge path is constituted by a uni-directional discharge tube represented at I, $I_1$, $I_2$ and $I_3$. The potential sources for exciting the filaments of the tubes selectively are represented at $I'_a$, $I'_{1a}$, $I''_{1a}$ and $I'''_{1a}$. The electronic paths are differentially connected with each of the line circuits and to ground in the manner described in connection with Fig. 15. At the controlled station I provide a twin diode 6H6 type tube individual to each of the lines $L_1$ and $L_2$ in a manner similar to the arrangement described in connection with Fig. 15. The diodes have been represented at $W_1$, $W_2$ connected to separate relay paths for independently operating the relays shown at $F_1$, $F_2$, $F_3$ and $F_4$. The circuits of the twin diodes are differentially connected with lines $L_1$ and $L_2$ in the manner shown in Fig. 15 and connected to the alternating current source represented by transformer $H_1$. The supplemental winding $H_{1'}$ of the power transformer furnishes heating current to both of the heaters of tubes $W_1$ and $W_2$. By selectively activating the electron discharge paths at the remote control station by selectively controlling switches $A_1$, $A_2$, $A_3$ and/or $A_4$ a corresponding one of the relays $F_1$, $F_2$, $F_3$ and $F_4$ at the controlled station may be operated. Condensers $J_1$, $J_2$, $J_3$ and $J_4$ are used to smooth out the current passing through the associated relay windings.

In lieu of the filament type tubes illustrated in Figs. 15 and 16, I may employ cold cathode types of tubes at the controlling station or at both the controlling station and controlled station. It is more important to eliminate the power source at the controlling station than at the controlled station so that I may employ the cold cathode types of tubes at the controlling station in association with heater or filament types of tubes at the controlled station. I have found the 1C21 gas triode ideal for the control system of my invention. I have illustrated this type of tube in Figs. 17 and 18 as located at the controlling station. This is an ionic-cathode-glow-discharge type of tube requiring no filament power whatever. In Fig. 17 I have illustrated a pair of these cold cathode types of tubes arranged in separate control paths and differentially connected to a single control line extending from a controlling station to a controlled station. The tubes are represented by reference characters U and $U_1$. Tube U includes a cold cathode $U'$, a control grid $U''$ and a plate $U'''$. Tube $U_1$ includes a cold cathode $U'_1$, control grid $U''_1$ and plate $U'''_1$. The control grid and plate of tube U are interconnected by resistance of a value of approximately 500,000 ohms while the control grid and plate of tube $U_1$ are interconnected with a similar resistance as shown. Cold cathode $U_1'$ connects with plate $U'''$ of tube U and connects with the control line leading to the controlled station. Cold cathode $U'$ and plate $U'''_1$ connect to the separate paths at the controlling station which contains selector switches $A_1$ and $A_2$ connected to ground at G. The paths for operating the cold cathode tubes is supplied from the source of alternating current $H_1$ at the controlled station through the circuit of the double diode W. Inasmuch as the circuit at the controlled station illustrated in Fig. 17 is identical with the circuit illustrated in Fig. 15, reference is made to the description thereof in connection with Fig. 15. Relays $F_1$ and $F_2$ are selectively controlled by starting the glow discharge through either of the glow discharge tube control paths upon closing switches $A_1$ or $A_2$.

Where it is desired to control a multiplicity of functions, I arrange the cold cathode tubes in pairs at the controlling station as represented in Fig. 18 and associate the pairs of tubes differentially with the lines $L_1$ and $L_2$ connected in the manner heretofore described in association with Fig. 16. The cold cathode tubes are represented at U, $U_1$, $U_2$ and $U_3$. The pair of tubes $U$—$U_1$ have their electrodes connected differentially and connected to line $L_2$ in the manner explained in Fig. 17. Switches $A_1$ and $A_2$ are connected in separate electron discharge paths as shown. Tubes $U_2$ and $U_3$ are connected differentially and in circuit with switches $A_3$ and $A_4$ as shown and associated with line $L_1$ leading to the controlled station. At the controlled station I have shown an arrangement of twin diodes of the 6H6 type as explained in connection with Fig. 16 in which like parts represent similar elements as described in connection with Fig. 16. Relays $F_1$, $F_2$, $F_3$ and $F_4$ are selectively operated by closing the respective switches $A_1$, $A_2$, $A_3$ and $A_4$ at the controlling station. The system operates instantaneously when the control switches are closed at the controlling station. There is no period of waiting for the filaments or heaters to warm up. Referring to Fig. 17 or Fig. 18 when the grid $U''$ is made positive by rectified voltage from the other end of the line, a glow discharge starts between grid and cathode when the grid is raised to about +80 volts. This starts a gas arc between plate $U'''$ and cathode $U'$ which handles the main line current for operating the relay $F_1$. The resistance protects the grid from carrying too much current. In other words the grid $U''$ is used only to start the plate-cathode arc. The tube acts like a rectifier because the arc can be started only when the grid-plate circuit is positive.

I may employ cold cathode tubes (1C21) at both ends of the line. The only difference is that twice the voltage is required from the A. C. transformer since the tubes at the controlled end would be in series with those at the control end and the initial arc-starting voltage would need to be twice that for a single tube.

The electron discharge path arrangement of control circuit has many advantages over the contact type of rectifier device because of its greater stability, more uniformity of operation, larger current per unit of area of the space occupied and the fact that minimum heat is generated in the tube type of control system. The contact type of rectifier requires reasonable ventilation for the physically mounted elements and reasonable matching of replacements must be made. In the case of the tube systems, stock replacements may be readily made and there are no critical matching requirements for the continued operation of the circuits.

While I have described my invention in certain preferred embodiments, I realize that changes and modifications may be made. My invention is capable of wide application and I do not intend that my invention be subjected to any limitations other than may be imposed by the scope of the appended claims.

What I claim as new and desire to secure by Letters Patent of the United States is as follows:

1. A remote control system comprising a controlling and controlled station interconnected by a line circuit, separate electron discharge paths differentially connected with said line circuit at the controlling station, separate electron discharge paths interconnected with said line circuit at the controlled station, relays disposed in the said electron discharge circuits at the controlled station and control switches arranged in the electron discharge circuits at the controlling station, the electron discharge paths at the controlling and controlled stations being arranged to provide a series aiding and opposing condition and a source of alternating current connected with all of the electron discharge paths at the controlled station.

2. A remote control system comprising a controlling station and a controlled station interconnected by a line circuit, pairs of uni-directional electron discharge paths connected with said line circuit, relays at said controlled station, coacting pairs of electron discharge paths individual to each of said relays, selector switches in each of the electron discharge paths at the controlling station for selectively starting the electronic discharge in the paths at said controlling station, said pairs of electron discharge paths at both said controlling and controlled station being connected in series-aiding series-opposing relation through said line circuit, and a source of alternating current located at said controlled station for supplying power to all of said electron discharge paths.

3. A remote control system comprising a controlling station and a controlled station interconnected by a line circuit, pairs of uni-directional electron discharge paths, each including a cold cathode electron discharge tube having a cold cathode, a control grid and a plate, a resistance interconnecting said grid and plate and a differential connection between the electrodes of said pairs of tubes and said line circuit, relays at said controlled station, coacting pairs of electron discharge paths individual to each of said relays, a differential connection between said pairs of electron discharge paths at said controlled station and said line circuit, a source of alternating current at said controlled station for activating said electron discharge paths, and selector switches in each of the electron discharge paths at the controlling station for selectively rendering said source of alternating current effective in said coacting electron discharge paths for selectively operating said relays.

PERCIVAL D. LOWELL.

REFERENCES CITED

The following references are of record in the file of this patent:

UNITED STATES PATENTS

| Number | Name | Date |
|---|---|---|
| 2,348,666 | Wallace | May 9, 1944 |
| 1,876,701 | Drewell | Jan. 14, 1908 |
| 2,349,129 | Albert | May 16, 1944 |
| 2,062,259 | Thomas | Nov. 24, 1936 |
| 2,205,272 | Powell | June 18, 1940 |
| 2,154,886 | Batchelet | Apr. 18, 1939 |
| 2,129,920 | FitzGerald | Sept. 13, 1938 |
| 1,982,290 | Gardner | Nov. 27, 1934 |
| 1,514,753 | Wold | Nov. 11, 1924 |
| 2,008,563 | Sarbey | July 16, 1935 |
| 2,364,771 | Bascom | Dec. 12, 1944 |
| 2,347,108 | Hubbard | Apr. 18, 1944 |

FOREIGN PATENTS

| Number | Country | Date |
|---|---|---|
| 314,112 | Great Britain | June 24, 1929 |
| 429,783 | Great Britain | June 6, 1935 |